Patented June 22, 1926.

1,589,608

UNITED STATES PATENT OFFICE.

EDWIN R. LITTMANN, OF TERRE HAUTE, INDIANA, ASSIGNOR TO COMMERCIAL SOLVENTS CORPORATION, OF TERRE HAUTE, INDIANA, A CORPORATION OF MARYLAND.

NITROCELLULOSE COMPOSITION.

No Drawing.   Application filed October 17, 1925. Serial No. 63,130.

My invention relates to nitrocellulose compositions containing ingredients which make them suitable for use as plastic masses, films, or lacquers.

It is well known to those familiar with its properties, that due to its brittleness, etc., nitrocellulose alone is not suitable for these purposes. In order to avoid these defects, it has been the custom for years to employ a softening agent, or plasticizer with the nitrocellulose. The inclusion of such a substance greatly increases the flexibility and toughness and at the same time decreases the tendency of the composition to peel and crack. In the past it has been the custom to employ for this purpose such substances as camphor or castor oil. The use of these compounds present certain disadvantages which my new and improved composition does not possess.

I am well aware that in the past a great many substances have been recommended as suitable for use as plasticizers for cellulosic compositions. These compounds may be divided into two classes:—Solvents and non-solvents. Camphor may be cited as a familiar example of the former class, and castor oil, of the latter class. Due to its high cost, odor, and other factors it is not always possible to use camphor. The use of castor oil also presents certain disadvantages in that compositions containing it may become rancid; also such a composition containing castor oil is apt to deteriorate rather rapidly and become weak and brittle.

A suitable plasticizer is one possessing in general the following properties:

(a) It should be a solvent for the cellulosic compound being used and soluble in the commonly used solvents.

(b) It should be highly stable and chemically neutral towards all other ingredients present in the composition.

(c) The vapor tension of the compound should be as low as possible so that it will not appreciably evaporate from a cellulosic composition and thereby change its nature.

I have discovered that normal tributyl phosphate is a compound embodying these properties. Normal tributyl phosphate may be obtained by the action of phosphorus oxychloride upon normal sodium butylate. A yield of approximately 75% of the theoretical or better may be obtained by this method.

Normal tributyl phosphate, when pure, is an odorless and colorless liquid, insoluble in water and boils at 135–136° C., under 8–10 mm. pressure. It boils well above 225° C., under normal atmospheric conditions. It is a good solvent for nitrocellulose.

The method of employment of normal tributyl phosphate as a nitrocellulose plasticizer is best illustrated by specific example of use.

*Example I.—Plastic masses.*

In the production of plastic masses the nitrocellulose is dissolved in a suitable solvent such as acetone, only sufficient solvent being used to reduce the nitrocellulose to a viscous semi-liquid mass. Normal tributyl phosphate is then added in amounts varying from 75% to 300% of the weight of the nitrocellulose, dependent on the degree of plasticity desired. The solvent mixture is then evaporated off by passing the mass over heated rolls or in other similar manner, and the plastic mass is moulded under heat and pressure.

*Example II.—Films.*

In the production of films a composition similar to that used for the manufacture of plastic masses is prepared. In this case however, more solvent is added so as to give a less viscous material which can be easily poured in thin layers into flat pans, where thin films are formed upon the evaporation of the solvent. This procedure may be modified and various types of film-forming machinery, known to those skilled in the art, may be used.

*Example III.—Lacquers.*

A nitrocellulose lacquer in its simplest form may be composed of nitrocellulose dissolved in a suitable solvent. It has been found, however, that films resulting from the evaporation of the solvent from such a composition are unsatisfactory in a number of ways, the resulting film being brittle, non-adherent and usually mottled in appearance. In order to remedy these defects, certain other substances are included in the lacquer. A plasticizer or softening agent is added to prevent brittleness and increase the strength of the film. I have discovered that normal tributyl phosphate is eminently suitable to serve as a plasticizer generally, and particularly because of its extreme chemical stability. Gums such as kauri, dammar, shellac, and ester may be incorporated in the composition in order to increase the adherence of the film to the undersurface. Coloring matter may be included, if desired. The solvent mixtures usually used contain alcohols, esters, hydrocarbons and ketonic bodies, if desired—alcohols being used to dissolve gums; hydrocarbons to dissolve gums and also cheapen the mixture; and esters such as ethyl acetate, butyl acetate, or butyl propionate to dissolve the nitrocellulose. The proportions of these various constituents must be carefully regulated within certain limits. It is necessary also that a certain amount of high boiling solvent be present to promote good flow and also to prevent "blushing". A typical lacquer formula in which normal tributyl phosphate is present as the plasticizer, follows:

8 ounces of nitrocellulose, 4 ounces of normal tributyl phosphate, 8 ounces gums (dammar and ester), 1 quart ethyl acetate, 1 quart butyl acetate, 1 quart benzol, 1 quart tuluol, coloring matter or pigment if desired.

Now, having fully described my invention, I claim the following as new and novel:—

1. A composition of matter comprising nitrocellulose and normal tributyl phosphate.

2. A composition of matter comprising 100 parts of nitrocellulose and 50–300 parts of normal tributyl phosphate.

3. A composition of matter comprising nitrocellulose, normal tributyl phosphate, and a solvent mixture capable of dissolving the aforementioned compounds.

4. A composition of matter comprising nitrocellulose, normal tributyl phosphate, and gum.

5. A composition of matter comprising nitrocellulose, normal tributyl phosphate, and pigment.

6. A composition of matter comprising nitrocellulose, normal tributyl phosphate, gum and pigment.

7. A composition of matter comprising nitrocellulose, normal tributyl phosphate, gum and a solvent mixture capable of dissolving the aforementioned compounds.

8. A composition of matter comprising nitrocellulose, normal tributyl phosphate, gum, a solvent mixture capable of dissolving the aforementioned compounds and pigment.

In testimony whereof I affix my signature.

EDWIN R. LITTMANN.